(12) United States Patent
Rao et al.

(10) Patent No.: US 9,507,589 B2
(45) Date of Patent: Nov. 29, 2016

(54) SEARCH BASED CONTENT INVENTORY COMPARISON

(71) Applicant: Red Hat, Inc., Raleigh, NC (US)

(72) Inventors: Milini A. Rao, Andover, MA (US); Kyle Baker, Plaistow, NH (US)

(73) Assignee: Red Hat, Inc., Raleigh, NC (US)

( * ) Notice: Subject to any disclaimer, the term of this patent is extended or adjusted under 35 U.S.C. 154(b) by 104 days.

(21) Appl. No.: 14/074,263

(22) Filed: Nov. 7, 2013

(65) Prior Publication Data

US 2015/0127497 A1 May 7, 2015

(51) Int. Cl.
*G06F 9/44* (2006.01)
*G06Q 10/08* (2012.01)

(52) U.S. Cl.
CPC .............. *G06F 8/71* (2013.01); *G06Q 10/087* (2013.01)

(58) Field of Classification Search
CPC ........................... G06F 8/71; G06F 17/30867
USPC ................. 717/120–121, 168–178; 707/754; 715/700–866
See application file for complete search history.

(56) References Cited

U.S. PATENT DOCUMENTS

| | | | | |
|---|---|---|---|---|
| 5,920,873 | A * | 7/1999 | Van Huben et al. | |
| 6,397,212 | B1 | 5/2002 | Biffar | |
| 7,469,409 | B2 * | 12/2008 | Donatelli | G06F 8/60 707/999.01 |
| 8,065,307 | B2 | 11/2011 | Haslam et al. | |
| 8,180,868 | B2 * | 5/2012 | Donatelli | G06F 8/60 709/221 |
| 8,225,292 | B2 * | 7/2012 | Naslavsky et al. | 717/126 |
| 8,255,362 | B2 * | 8/2012 | Johnson et al. | 707/625 |
| 8,370,803 | B1 * | 2/2013 | Holler | G06F 8/36 717/101 |
| 8,418,147 | B1 * | 4/2013 | Odenwelder | G06F 11/3684 717/128 |
| 8,533,844 | B2 * | 9/2013 | Mahaffey et al. | 726/25 |
| 8,561,012 | B1 * | 10/2013 | Holler | G06F 9/44 717/102 |
| 8,635,204 | B1 * | 1/2014 | Xie et al. | 707/709 |
| 8,701,078 | B1 * | 4/2014 | Holler | G06F 8/35 715/273 |
| 8,739,047 | B1 * | 5/2014 | Holler | G06F 3/04842 715/221 |
| 8,739,112 | B1 * | 5/2014 | Reed | G06F 8/33 717/101 |
| 8,799,044 | B2 * | 8/2014 | Sudarshan | G06Q 10/067 705/7.14 |

(Continued)

OTHER PUBLICATIONS

NPL—Beginning Ubuntu Linux, Fifth Edition, The Complete Introduction to Ubuntu—Apress—Emilio Raggi, Keir Thomas, Trevor Parsons, Andy Channelle, Sander van Vugt, 2010—Chapter 20, pp. 415-442.*

(Continued)

*Primary Examiner* — Francisco Aponte
(74) *Attorney, Agent, or Firm* — Lowenstein Sandler LLP

(57) ABSTRACT

The subject matter of this specification can be implemented in, among other things, a method that includes receiving a selection of content filters for content data that identifies products, packages, and repositories, and receiving a selection of environment filters. The method includes filtering the content data to identify content items in view of the content filters and the environment filters. The content items include one or more of the repositories, the products, or the packages. The method includes causing presentation of a list of the content items, which organizes the content items in view of release environments that are within the content items and repositories that are within the content items. The method includes receiving a selection of repository-environment combinations from the subset of the release environments and the subset of the repositories and causing presentation of a comparison of ones of the packages for each of the repository-environment combinations.

19 Claims, 5 Drawing Sheets

(56) References Cited

U.S. PATENT DOCUMENTS

| | | | |
|---|---|---|---|
| 8,819,617 B1* | 8/2014 | Koenig | G06F 8/70 717/101 |
| 8,984,628 B2* | 3/2015 | Mahaffey et al. | 726/22 |
| 9,159,039 B2* | 10/2015 | Diao | G06Q 10/04 |
| 9,177,269 B2* | 11/2015 | Diao | G06Q 10/04 |
| 2002/0057290 A1* | 5/2002 | Wilkinson et al. | 345/744 |
| 2005/0091642 A1* | 4/2005 | Miller | G06F 11/3664 717/124 |
| 2006/0282480 A1* | 12/2006 | Johnson et al. | 707/203 |
| 2006/0288054 A1* | 12/2006 | Johnson et al. | 707/203 |
| 2006/0288055 A1* | 12/2006 | Johnson et al. | 707/203 |
| 2007/0101197 A1* | 5/2007 | Moore et al. | 714/38 |
| 2007/0168956 A1* | 7/2007 | Moore et al. | 717/120 |
| 2009/0132645 A1 | 5/2009 | Yang et al. | |
| 2009/0199047 A1* | 8/2009 | Vaitheeswaran | G06F 11/3409 714/47.2 |
| 2009/0199160 A1* | 8/2009 | Vaitheeswaran | G06F 11/3414 717/124 |
| 2009/0281857 A1* | 11/2009 | Amling et al. | 705/7 |
| 2009/0319544 A1* | 12/2009 | Griffin | G06F 17/30563 |
| 2010/0042603 A1 | 2/2010 | Smyros et al. | |
| 2010/0114642 A1* | 5/2010 | Dufosse et al. | 705/9 |
| 2010/0205266 A1* | 8/2010 | Wang et al. | 709/206 |
| 2010/0250511 A1* | 9/2010 | Wurzer | 707/706 |
| 2011/0055544 A1* | 3/2011 | Vidal et al. | 713/100 |
| 2011/0055826 A1* | 3/2011 | Vidal et al. | 717/177 |
| 2011/0107300 A1* | 5/2011 | Vidal | G06F 8/65 717/121 |
| 2012/0137138 A1* | 5/2012 | Gregorovic et al. | 713/189 |
| 2012/0240236 A1* | 9/2012 | Wyatt et al. | 726/25 |
| 2012/0284111 A1 | 11/2012 | Shi et al. | |
| 2012/0330937 A1 | 12/2012 | Frazier | |
| 2013/0014006 A1* | 1/2013 | Abellera et al. | 715/234 |
| 2013/0159867 A1* | 6/2013 | Nuggehalli et al. | 715/738 |
| 2013/0339932 A1* | 12/2013 | Holler | G06F 11/3684 717/128 |

OTHER PUBLICATIONS

NPL—Beginning Ubuntu Linux From Novice to Professional, Kei Thomas; 2006—Chapter: 29, pp. 413-434.*

The Waterfall Model in Large-Scale Development—Kai Petersen, Claes Wohlin, and Dejan Baca; Blekinge Institute of Technology, Ronneby, Sweden; Ericsson AB, Karlskrona, Sweden—F. Bomarius et al. (Eds.): PROFES 2009, LNBIP 32, pp. 386-400, 2009—Springer-Verlag Berlin Heidelberg 2009.*

Integrating agile software development into stage-gate managed product development—Daniel Karlstro¨ m & Per Runeson—Empir Software Eng (2006)—Department of Communication Systems, Lund University, Box 118, SE-221 00 Lund, Sweden—Springer Science, Business Media, Inc. 2006.*

Toward a distributed package management system—Fabien Dagnat, Gwendal Simon, Xu Zhang; Institut Telecom Telecom Bretagne, France—Lococo 2011: workshop on logics for component con_guration, Sep. 2011, Perugia, Italy.*

Zhang et al., "Evaluation and Evolution of a Browse and Search Interface: Relation Browser ++", In: Proceedings of the 2005 national conference on Digital government research, 2005, pp. 179-188.

* cited by examiner

SEARCH BASED CONTENT INVENTORY COMPARISON

TECHNICAL FIELD

This instant specification relates to a user interface for search based content inventory comparison.

BACKGROUND

In software, a package management system, sometimes called a package manager, includes software tools that automate the installation, upgrade, configuration, and removal of software packages for software programs on client computer systems. Package management systems provide remote administration and software distribution that takes the place of manual installations and updates. Packages are distributions of software, applications, and data. Packages may also contain metadata, such as the software's name, a description of the purpose of the software, a version number of the software, a vendor name for the software, a checksum for the software, and a list of dependencies for the software to run properly. Upon installation, the metadata may be stored in a package database. The package management system may use the list of software dependencies and version information to prevent software mismatches and missing prerequisites.

DETAILED DESCRIPTION

This specification describes systems, processes, and user interfaces for search based content inventory comparison. Release management systems often manage a large number of products. Those products may each be made up of one or more packages. Each package for each product may have one or more instances corresponding to different versions of the package. Each version of a package may be hosted by one or more repositories. A group of versions of packages may be bundled together as a changeset or system template and used by the release management system as a release to be distributed to client computer systems. The changeset and/or system template may represent a particular stage of a development cycle for a product that includes those packages.

The stages of the development cycle may be associated with a particular installation environment, such as a development, testing, or production environment. Sometimes a set of versions of packages may be promoted from one environment to another or another release management operation may be performed, such as adding and/or removing a package to or from a changeset or modifying a version of a package in a changeset. In performing release management operations, a user of the release management system may want to search for and identify particular versions of packages for particular products, repositories, and/or environments. In addition, the user may want to compare the identified items to aid in making a decision related to the release management operation to be performed.

The systems, processes, and user interfaces described below provide tools for quickly searching for and identifying particular products, repositories, and packages within the release management system. The systems, processes, and user interfaces described below also provide tools for comparing packages across repositories and environments. In addition, as a result of the identification and comparison, the systems, processes, and user interfaces described below further provide for performing release management operations, such as modifying packages and/or versions of packages within changesets and/or system templates.

Figure 1:
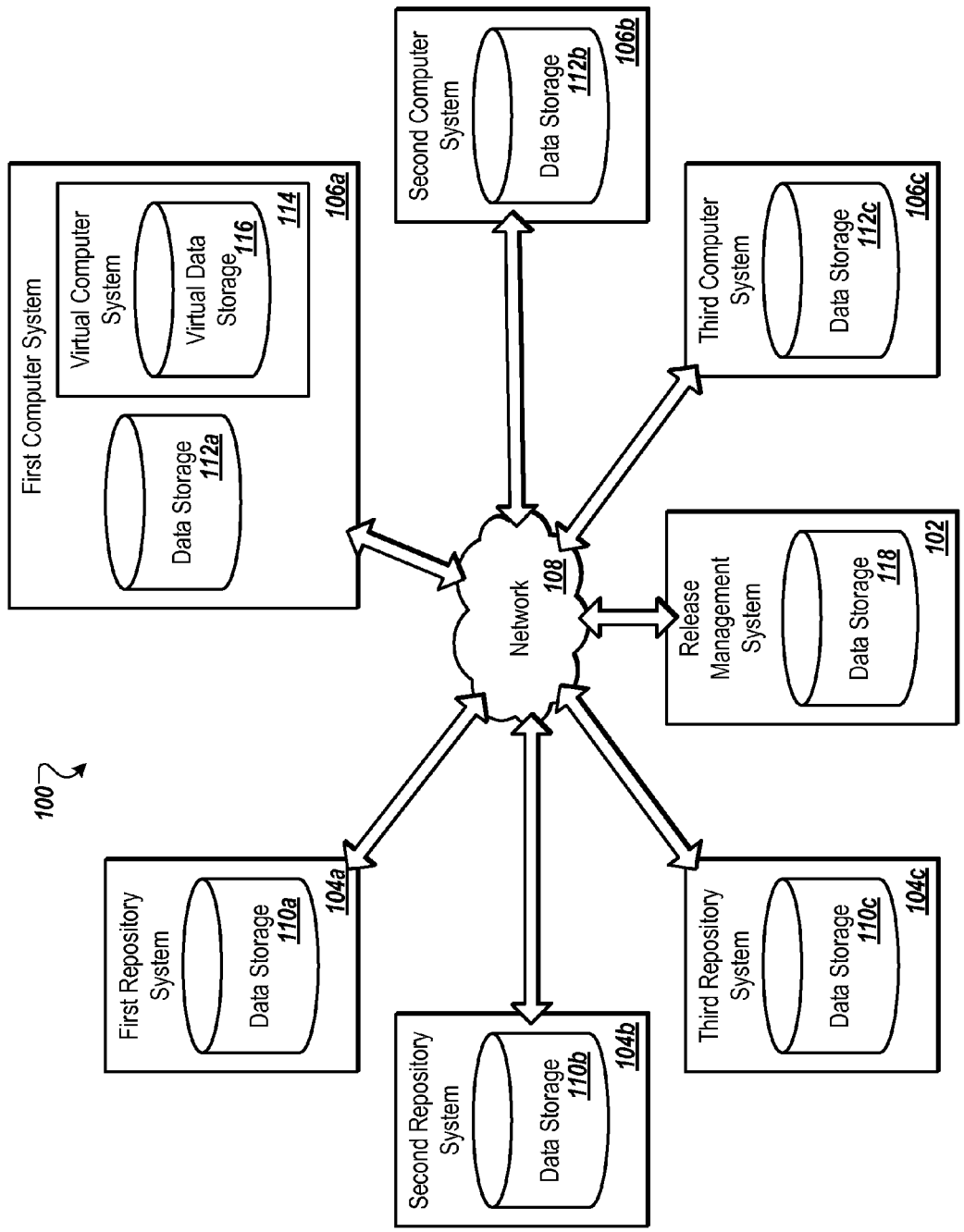
FIG. 1 is a schematic diagram that shows an example of a system for search based content inventory comparison.

FIG. 1 is a schematic diagram that shows an example of a system 100 for search based content inventory comparison. The system 100 includes a release management system 102, multiple repository systems 104a-c, and multiple computer systems 106a-c in communication with a network 108.

The network 108 may include wired and/or wireless communication devices. The network 108 may include a local network, a wide network, and/or one or more of the computer devices that make up the Internet.

The repository systems 104a-c store software packages for software products in multiple data storages 110a-c, respectively. The repository systems 104a-c provide the packages to the computer systems 106a-c for installation at the computer systems 106a-c within multiple data storages 112a-c, respectively.

In addition, one or more of the computer systems 106a-c may include a virtual computer system 114. The virtual computer system 114 is a virtual machine that emulates a physical computer device using software. The virtual computer system 114 may include a virtual data storage 116 in which the virtual computer system 114 may install one or more of the packages from the repository systems 104a-c.

The computer systems 106a-c may install new versions of the packages as sets of packages are promoted from one environment to another, e.g., from a development environment to a testing environment or from a testing environment to a production environment. The release management system 102 provides a user interface for managing the distribution and installation of the packages at the computer systems 106a-c as well as promotion of the packages.

The release management system 102 stores content data in a data storage 118. The release management system 102 may retrieve the content data from the repository systems 104a-c and/or the computer systems 106a-c. The content data identifies the products and versions of packages within the products that are available at each of the repository systems 104a-c. The content data also identifies the environments to which each of the versions of the packages belong. In some implementations, the release management system 102 may store data describing ones of the computer systems 106a-c to which each of the versions of the packages have been distributed and/or installed. In addition, the release management system 102 may store data describing dependencies between versions of the products and/or packages.

The release management system 102 provides a user interface for searching or filtering the content data and comparing the results of the search. In some implementations, the user interface is provided at the release management system 102. In some implementations, the release management system may provide the user interface to a computer device that is separate or remote from the release management system 102. The user interface may be a standalone application, such as a desktop application or a mobile device app. The release management system 102 may provide data to the standalone application for presentation to a user, such as the results of the search or filtering and the comparison.

Alternatively, a server application at the release management system 102 may provide instructions to an interpreter application, such as a browser application, at the release management system 102 or at a remote computer device. The interpreter application processes the instructions to present the results of the search or filtering and the comparison to the user. In the case of the browser application, the instructions may include markup, such as Hypertext Markup Language (HTML) and/or Extensible Markup Language (XML). The instructions may also include scripting instructions, such as JavaScript. The browser application processes the markup and scripting to present the results of the search or filtering and the comparison to the user.

Figure 2A:
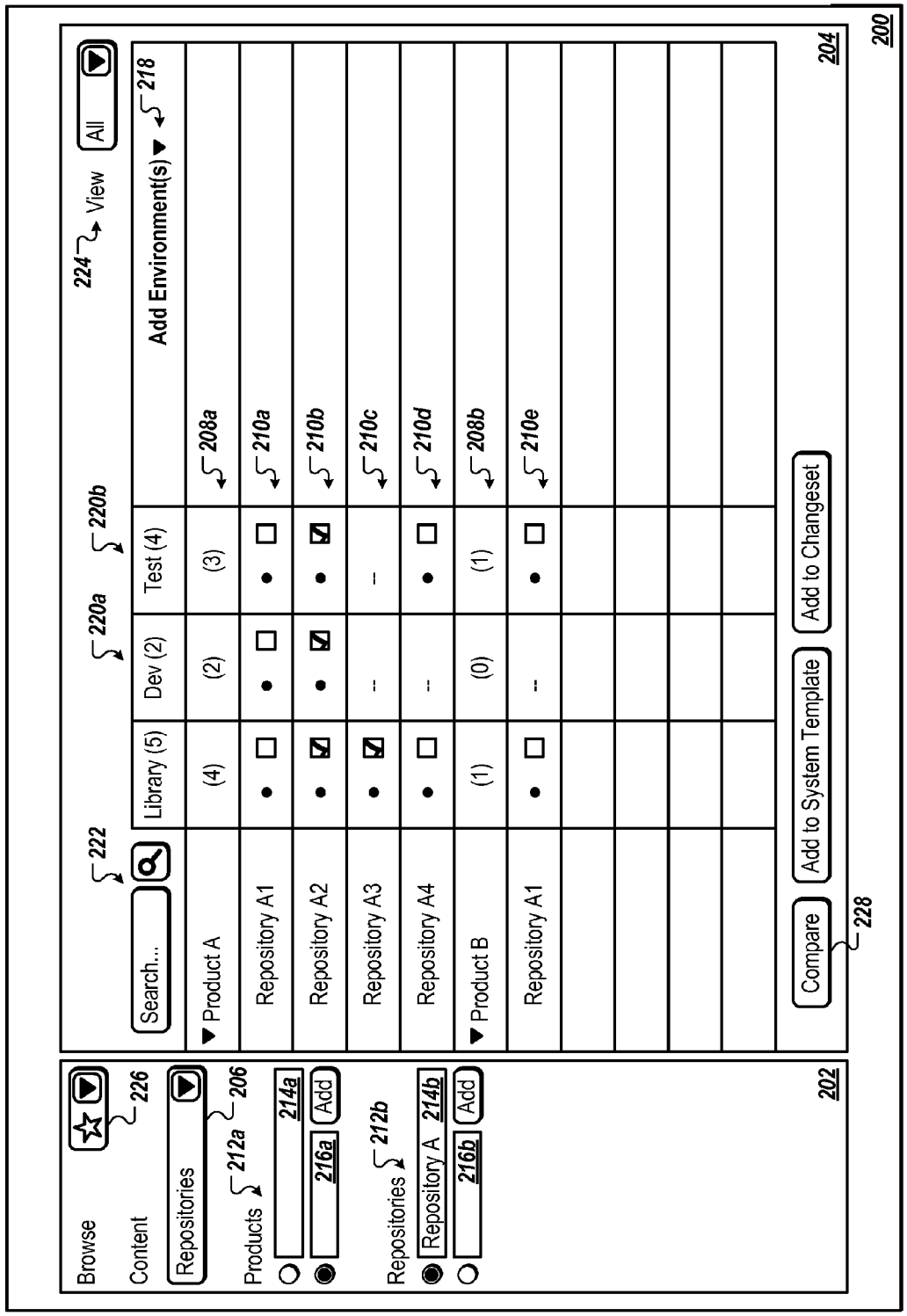
FIGS. 2A-B show examples of user interfaces for search based content inventory comparison.

FIG. 2A shows an example of a user interface 200 for search based content inventory comparison. The user interface 200 may be presented to a user on a display device, for example, at the release management system 102 or another computer system. The user interface 200 includes a filter area 202 and a results area 204. A user may make inputs in the filter area 202 to select filters that filter content data, such as the content data stored in the data storage 118 of the release management system 102.

The filter area 202 includes a content type filter 206. The content type filter 206 allows a user to make an input to select the type of content to be presented in the results area 204. The content type filter 206 may be, for example, a pull-down list with options that include packages, products, and repositories. In some implementations, the results presented in the results area 204 are hierarchical and the content type filter 206 selects the lowest level of the hierarchy to be presented in the results area 204. For example, the user has selected "Repositories" in the content type filter 206. Accordingly, the results area 204 presents a hierarchy that includes multiple products 208a-b and multiple repositories 210a-e as the lowest level below each of the products 208a-b. In particular, the Repositories A1, A2, A3, and A4 all store packages for Product A and, accordingly, are listed below the first product 208a in the results area 204. The Repository A1 also stores packages for Product B and, accordingly, is listed below the second product 208b in the results area 204. In another example, a user may select "Packages" in the content type filter 206. The results area 204 may then present one or more packages below each of the repositories 210a-e representing the packages stored at the repository.

The filter area 202 also includes multiple content filters 212a-b. The first content filter 212a is a products content filter that is applied to products in the content data. The second content filter 212b is a repositories content filter that is applied to repositories in the content data. The content filters 212a-b may include multiple keyword filters 214a-b and multiple individual filters 216a-b. A user may make an input in the first keyword filter 214a to request that the products be filtered based on a keyword appearing in data for the products, such as in names or identifiers of the products. A user may make an input in the second keyword filter 214b to request that the repositories be filtered based on a keyword appearing in data for the repositories, such as in names or identifiers of the repositories. The second keyword filter 214b includes the keyword "Repository A." Accordingly, the user interface 200 only includes repositories in the results area 204 that have "Repository A" in the name of the repository, e.g., "Repository A1," "Repository A2," "Repository A3," and "Repository A4."

The individual filters 216a-b allow a user to input a name or portion of a name of a content item of the corresponding content type. For example, a user may input a name or portion of a name of a specific product in the first individual filter 216a or a specific repository in the second individual filter 216b. The user may then select an "Add" button to request that the specific content item be added as a filter. The user interface 200 may then present a list of the specific individual content filters below the corresponding one of the individual filters 216a-b.

In some implementations, the user interface 200 may disable a keyword filter for a content type if the individual filter for the content type is being used and vice versa. Alternatively, the user interface 200 may allow both the keyword filter and the individual filter for the content type to be used concurrently. For example, the separate results from the keyword filter and the individual filter for the content type may be combined in the results area 204.

In some implementations, the user interface 200 may disable and/or cease presentation of ones of the content filters 212a-b that are below the content type that has been selected in the content type filter 206 in the hierarchy of content types. For example, in response to selection of "Repositories" in the content type filter 206, the user interface 200 may disable and/or cease presenting a content filter for packages because packages are below repositories in the hierarchy of content types. If "Packages" had been selected in the content type filter 206, then the user interface 200 would present a content filter for packages, which may have corresponding keyword and individual filters. The packages presented in the results area 204 below each of the repositories 210a-e would then be the result of any filters specified in the package content filter.

The results area 204 includes an environment filter 218. In response to a user selecting the environment filter 218, the user interface 200 presents a list of environments from which the user may make selections. The environments represent levels in a release process for one or more products and/or packages within the products. The environments may include, for example, a development environment where software is initially written or developed. The environments may include a testing environment where software is installed for testing. The environments may include a production environment where software is installed for use in production. While described here as three levels, the environments may include more or fewer levels. In addition, the three types of environments described may include multiple levels.

As a set of versions of packages for one or more products completes a level of the release process it is promoted to the next level. The set of versions of packages may be referred to as a changeset. For example, once packages in a changeset have been written by developers, the changeset may be promoted from a development environment to a testing environment. Once testing has been completed, the changeset may be promoted from the testing environment to the production environment.

The computer systems 106a-b and/or the virtual computer systems 114 may request the current packages for a particular environment. For example, the first computer system 106a may be a developer console that loads packages of one or more products for a development environment. The second computer system 106b may be a testing station that loads packages of one or more products for a testing environment. The third computer system 106c may be a production server that loads packages of one or more products for a production environment.

The user interface 200 presents the list of environments in response to user selection of the environment filter 218. The user may select individual environments from the list, or in some implementations, the user may select a set or progression of environments (e.g., corresponding development, testing, and production environments). In response to selection of a development environment filter and a testing environment filter in the list of environment filters, the user interface 200 presents content data for multiple environments 220a-b. In particular, the user interface 200 presents content items in the results area 204 that satisfy both the content filters 212a-b (e.g., repositories that include "Repository A" in their names) and the environment filters (e.g., the "Dev" and "Test" environments). In some implementations, the results area 204 also presents a default environment referred to as "Library." The Library default environment may include, for example, a list of versions (e.g., the latest versions and/or all versions) of each package for each product at each repository.

Each cell in the grid shown in the results area 204 represents a combination of a particular content item and an environment in which the content item exists. Each cell may present information about the combination. For example, the cell for the first product 208a and the first environment 220a indicates that there are two repositories within the first product 208a that satisfy the second content filter 212b (e.g., the first repository 210a and the second repository 210b). In response to selection of a cell (e.g., hovering a pointer over the cell or clicking on the cell), the user interface 200 may present additional information, such as numbers of content items, if any, within the selected content item and/or a link to a user interface that lists the content items that are within the selected content item.

The results area 204 may include a keyword filter 222. A user may input one or more keywords into the keyword filter 222. In response, the user interface 200 filters the list of content items in the results area 204 in view of the keywords in the keyword filter 222. The user interface 200 may include only those content items that include the keywords from the keyword filter 222, regardless of the type of the content item. For example, a user may input "A" in the keyword filter 222. The user interface 200 may then continue to present the first product 208a and the repositories 210a-e because their names all include "A." The user interface 200 may stop presenting the second product 208b as its name does not include "A."

The results area 204 may also include a uniqueness filter 224. In response to selection of the uniqueness filter 224, the user interface 200 may present a list of options including "All," "Unique Content," and "Shared Content." In response to selection of the "All" option, the user interface 200 may present all of the content items that satisfy the other filters, such as one or more of the content type filter 206, the content filters 212a-b, the environment filter 218, or the keyword filter 222.

In response to selection of the "Unique Content" option, the user interface 200 may present the content items that are unique across the environments 220a-b, such as the fourth repository 210d within the first product 208a and the fifth repository 210e within the second product 208b. The fourth repository 210d has unique content because the first environment 220a does not include any packages from the fourth repository 210d as indicated by the dash in the results area 204 for that cell, while the second environment 220b does include one or more packages from the fourth repository 210d as indicated by the checkbox in the results area 204 for that cell. The fifth repository 210e has unique content because the first environment 220a does not include any packages from the fifth repository 210e as indicated by the dash in the results area 204 for that cell, while the second environment 220b does include one or more packages from the fifth repository 210e as indicated by the checkbox in the results area 204 for that cell. While described here as "the fifth repository 210e," this repository may be the same repository as one or more other repositories in the results area 204, such as the first repository 210a (e.g., both are "Repository A1").

In response to selection of the "Shared Content" option, the user interface 200 may present the content items that are shared across the environments 220a-b, such as the first repository 210a and the second repository 210b within the first product 208a. The first repository 210a has shared content because the first environment 220a includes one or more packages from the first repository 210a as indicated by the checkbox in the results area 204 for that cell, and the second environment 220b also includes one or more packages from the first repository 210a as indicated by the checkbox in the results area 204 for that cell. The second repository 210b has shared content because the first environment 220a includes one or more packages from the second repository 210b as indicated by the checkbox in the results area 204 for that cell, and the second environment 220b also includes one or more packages from the second repository 210b as indicated by the checkbox in the results area 204 for that cell.

The user interface 200 may apply the uniqueness filter 224 to the type of content in the results area 204 that was selected in the content type filter 206. For example, because "Repositories" is selected in the content type filter 206, the user interface 200 may apply the uniqueness filter 224 to the repositories 210a-e in the results area 204. If "Packages" is selected in the content type filter 206, then the user interface 200 may apply the uniqueness filter 224 to packages in the results area 204. In addition, if "Products" is selected in the content type filter 206, then the user interface 200 may apply the uniqueness filter 224 to products in the results area 204.

The filter area 202 may include a favorites control 226. In response to selection of a first portion of the favorites control 226, the user interface 200 may store the entries from one or more of the content type filter 206, the content filters 212a-b, the keyword filter 222, the environment filter 218, or the uniqueness filter 224. The user interface 200 may present an input dialog to the user in which the user may input a name for the set of filters, such as "Repository A." Subsequently, the user may select a second portion of the favorites control 226. In response, the user interface 200 presents a list of the saved sets of filters, including the "Repository A" set of filters. In response to selection of a set of filters from the list, the user interface 200 populates one or more of the content type filter 206, the content filters 212a-b, the keyword filter 222, the environment filter 218, or the uniqueness filter 224 with the stored values for the corresponding filter and presents the results of the filters in the results area 204.

One or more of the cells in the grid of the results area 204 may include multi-select controls, such as checkboxes. Each cell may represent a combination of a particular content item, such as a repository, and a particular environment. Selecting a multi-select control, selects the corresponding combination of content item and environment. Once a set of combinations is selected, the user may request that an operation be performed on the set of combinations. For example, in response to a user selection of a compare control 228, the user interface 200 may present a comparison of content items between each of the selected repository-environment combinations.

Figure 2B:
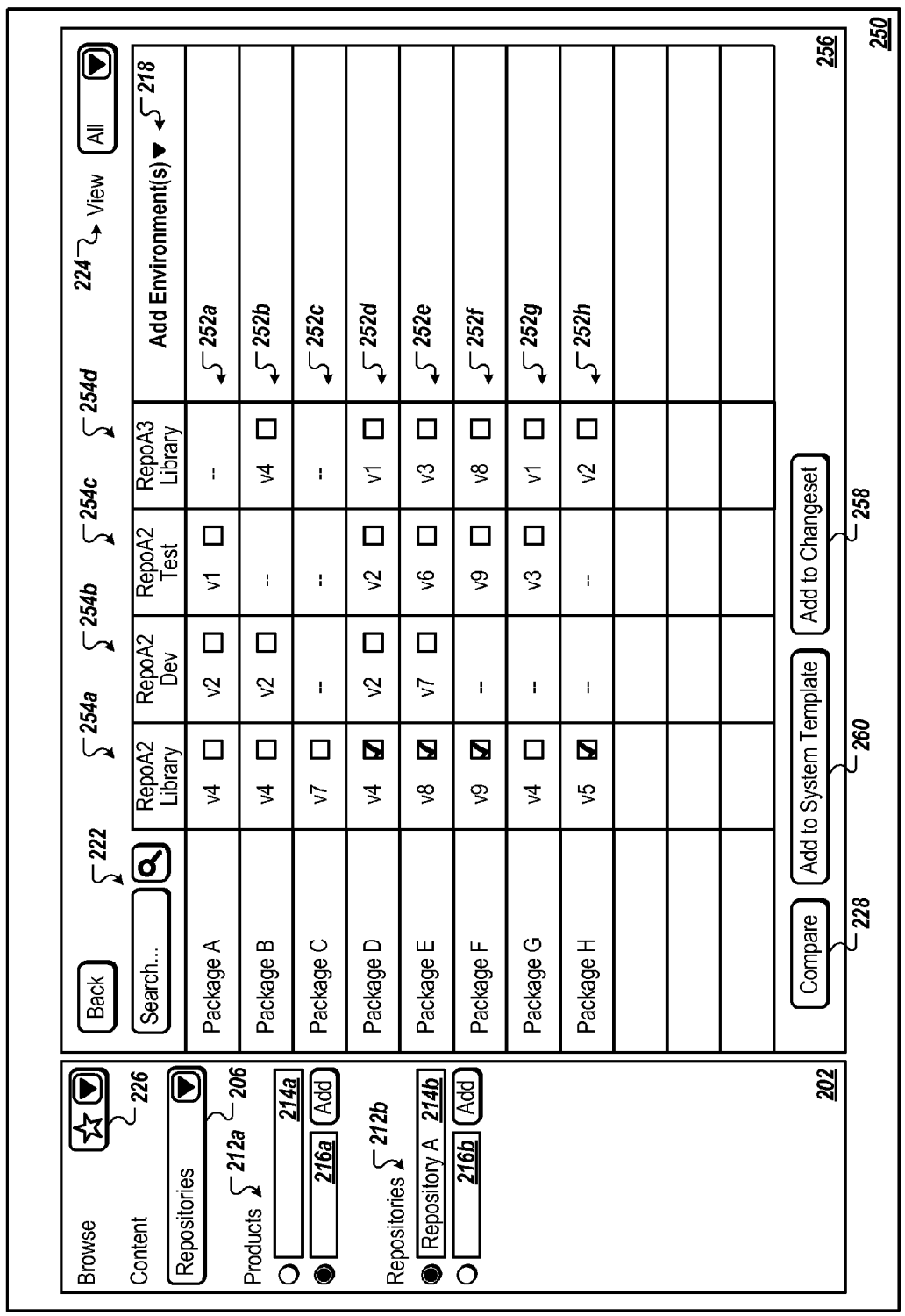

FIG. 2B shows an example of a user interface 250 for search based content inventory comparison. The user interface 250 presents a comparison of multiple packages 252a-h across multiple repository-environment combinations 254a-d in a comparison area 256. For example, the packages 252a-h may be presented along a vertical axis of a grid and the repository-environment combinations 254a-d may be presented along a horizontal axis of the grid, or vice versa. The user interface 250 may present the comparison in response to selection of the compare control 228.

Each of the cells in the grid may present information about the package-repository-environment combination, such as a version of the package within the repository-environment combination. For example, the cells for the first package 252a show that Package A has a version of four for the first repository-environment combination 254a (Repository A2 and the Library environment), a version of two for the second repository-environment combination 254b (Repository A2 and the Dev environment), a version of one for the third repository-environment combination 254c (Repository A2 and the Test environment), and that the Package A is not present within the fourth repository-environment combination 254d (Repository A3 and the Library environment).

As with the cells in the results area 204, the user interface 250 may present additional information for each of the cells in the comparison area 256 in response to a selection, such as a hover or click operation of a pointer device, from the user. In the case of packages, the additional information may include, for example, an identifier of a person that committed or finalized the version of the package represented by the cell. The additional information may also include the time and/or date that the version was committed or finalized.

Also similar to the results area 204, each of the cells may include a multi-select control, such as a check-box, that allows the user to select multiple packages within the comparison area 256. The user may then request that the user interface 250 perform an operation on the selected packages. For example, in response to a user selection of a changeset control 258, the user interface 250 may present a list of changesets to which the selected packages may be added and/or a control for creating a new changeset that includes the selected packages. The user may then select a changeset from the list or the changeset creation control to request the operation. Alternatively, the user may select a system template control 260. In response, the user interface 250 may present a list of system templates to which the selected packages may be added and/or a control for creating a new system template that includes the selected packages. The user may then select a system template from the list or the system template creation control to request the operation.

In some implementations, the results area 204 and/or the comparison area 256 disable the compare control 228 unless content items from two different environments and/or repository-environment combinations are selected. In addition, the results area 204 and/or the comparison area 256 may disable the changeset control 258 and/or the system template control 260 unless content items from the same environment and/or the same repository-environment combination are selected.

Figure 3:
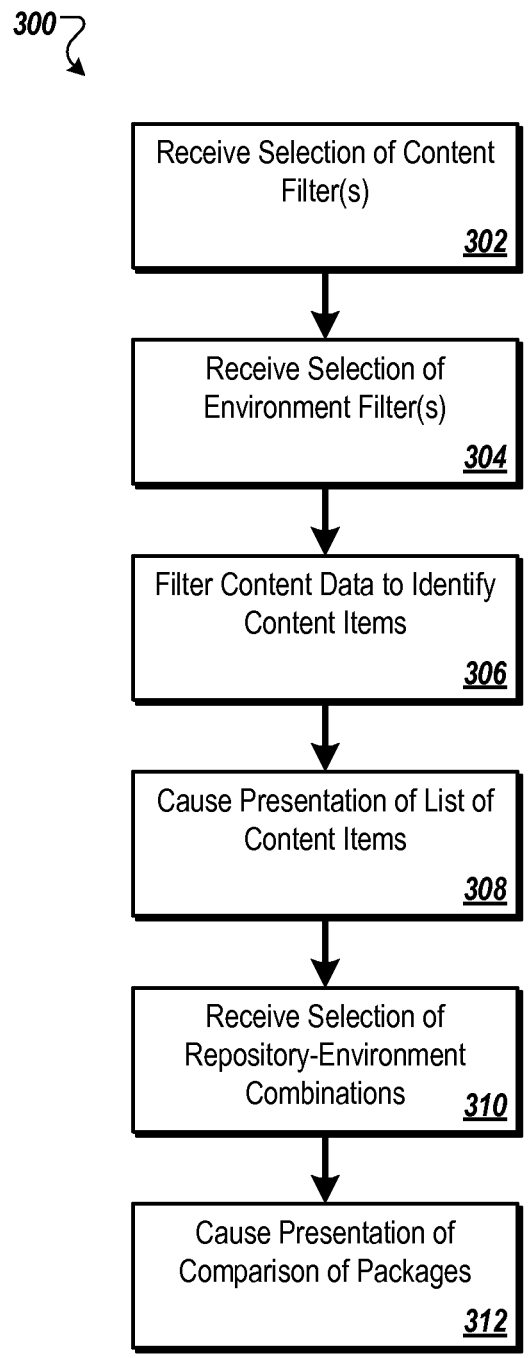
FIG. 3 is flow chart that shows an example of a process for search based content inventory comparison.

FIG. 3 is a flow chart that shows an example of a process 300 for search based content inventory comparison. The process 300 may be performed, for example, by a system such as the system 100. For clarity of presentation, the description that follows uses the system 100 as an example for describing the process 300. However, another system, or combination of systems, may be used to perform the process 300.

At box 302, the process 300 begins with receiving a selection of one or more content filters from a plurality of content filters including a products content filter, a repositories content filter, and a packages content filter. A release management system stores content data that identifies a plurality of products that each have a plurality of packages. The content data identifies each of the plurality of packages as a particular version of at least a component of a corresponding one of the plurality of products. The content data also identifies a plurality of repositories that each store a subset of the plurality of packages for one or more of the plurality of products. For example, the release management system 102 may receive the selections in the content filters 212a-b from the user interface 200. The user interface 200 may be in operation at the release management system 102 or at a computer device that is separate from the release management system 102 and in communication with the release management system 102, such as over the network 108.

At box 304, the process 300 includes receiving a selection of one or more environment filters from a plurality of environment filters. The release management system has a plurality of release environments including one or more of a development environment, a testing environment, or a production environment. The plurality of environment filters comprise one or more of a development environment filter, a testing environment filter, or a production environment filter that correspond to the plurality of release environments. Each of the plurality of release environments has a corresponding one of a plurality of changesets that includes at least one package from the plurality of packages for one or more of the plurality of products. For example, the release management system 102 may receive the selections of environments using the environment filter 218 of the user interface 200.

At box 306, the process 300 includes filtering the content data to identify a first plurality of content items in view of the one or more content filters and the one or more environment filters. The first plurality of content items includes one or more of the plurality of repositories, the plurality of products, or the plurality of packages. For example, the release management system 102 may use the values from the content filters 212a-b to filter the content data from the data storage 118 and identify one or more content items.

At box 308, the process 300 includes causing presentation of a list of the first plurality of content items. The presentation organizes the first plurality of content items in view of a subset of the plurality of release environments that are within the first plurality of content items and a subset of the plurality of repositories that are within the first plurality of content items. For example, the release management system 102 may cause the user interface 200 to present the identified content items in the results area 204.

At box 310, the process 300 includes receiving a selection of a plurality of repository-environment combinations from the subset of the release environments and the subset of the plurality of repositories. For example, the release management system 102 may receive the selections of the repository-environment combinations from the user interface 200 using the multi-select controls in the results area 204.

At box 312, the process 300 includes causing presentation of a comparison of ones of the plurality of packages for each of the plurality of repository-environment combinations. For example, the release management system 102 may cause the user interface 250 to present the comparison of the packages for the repository-environment combinations in the comparison area 256. The user interface 250 may be in operation at the release management system 102 or at a computer device that is separate from the release management system 102 and in communication with the release management system 102, such as over the network 108.

In some implementations, the process 300 may include receiving a selection of a content type from a plurality of content types comprising a products content type, a repositories content type, and a packages content type. The presentation of the list of the first plurality of content items may then be organized further in view of the content type.

In some implementations, the process 300 may include receiving a selection of a uniqueness filter from a plurality of uniqueness filters comprising a unique filter that filters for unique ones of the content type across the subset of the release environments, a shared filter that filters for shared ones of the content type across the subset of the release environments, and an all filter that filters for all of the content type across the subset of the release environments. Filtering the content data to identify the first plurality of content items may then be further in view of the uniqueness filter.

In some implementations, the process 300 may include receiving a selection of a content item from the first plurality of content items in the list. The process 300 may then include causing presentation of a list of a second plurality of content items that are within the content item in response to receiving the selection of the content item.

In some implementations, the process 300 may include receiving a selection of a keyword search term. Filtering the content data to identify the first plurality of content items may then be further in view of the keyword search term.

In some implementations, the process 300 may include receiving a selection of one or more packages from the comparison of the ones of the plurality of packages for each of the plurality of repository-environment combinations. The process 300 may then include adding the one or more packages to a changeset in the plurality of changesets.

Figure 4:
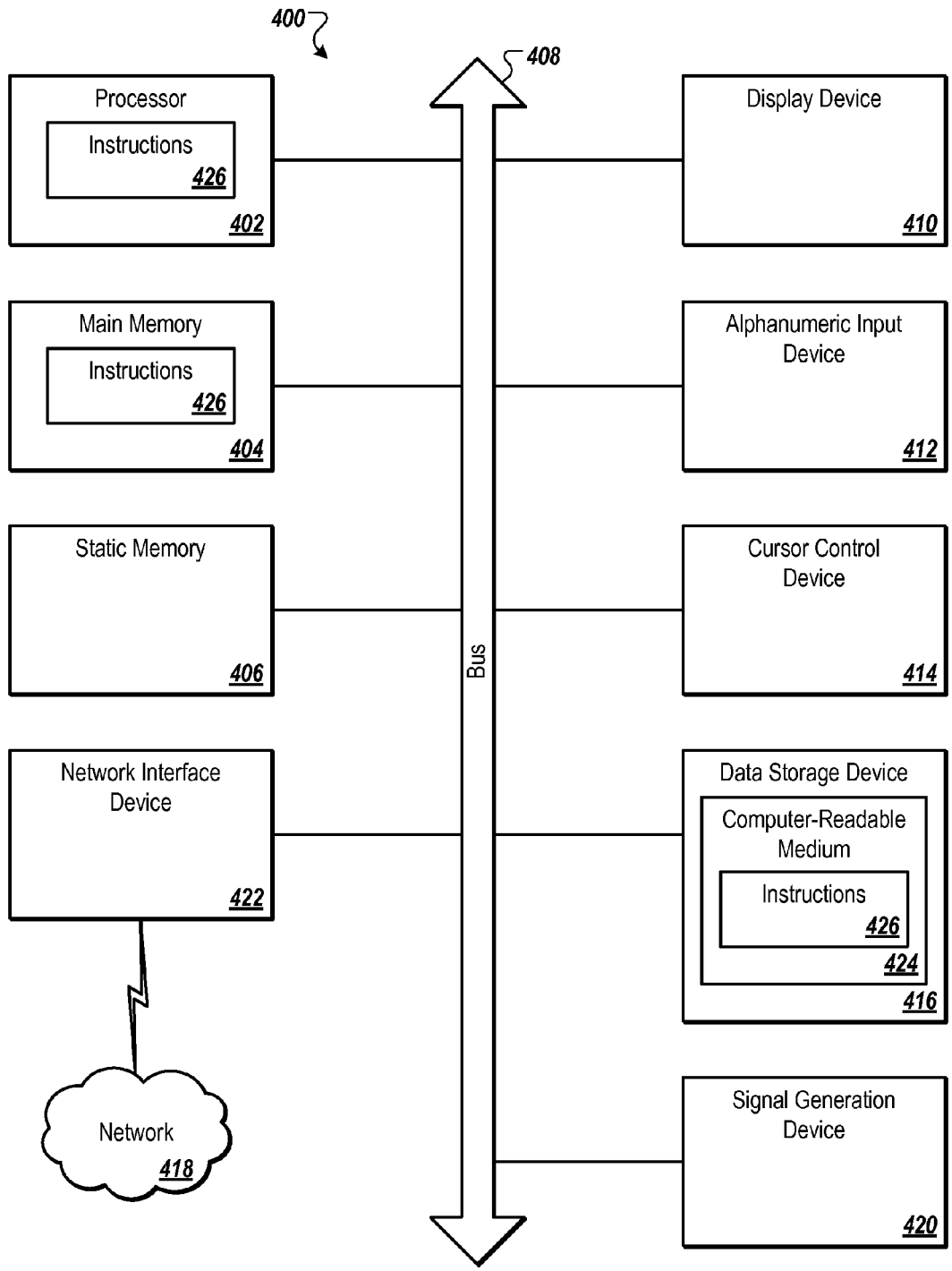
FIG. 4 is a schematic diagram that shows an example of a computer system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the release management system 102, the repository systems 104a-c, and/or the computer systems 106a-c for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the release management system 102, the repository systems 104a-c, and/or the computer systems 106a-c embodying any one or more of the methodologies or functions described herein. The sets of instructions 426 of the release management system 102, the repository systems 104a-c, and/or the computer systems 106a-c may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, using a processing device of a release management system, a selection of content data identifying a plurality of products, each of the plurality of products comprising a plurality of packages, wherein the release management system comprises a plurality of release environments comprising a development environment, a testing environment, and a production environment with each release environment representing an installation area in which a portion of the packages associated with the content data is to be released;
   receiving a selection of first and second environment filters from a plurality of environment filters, the plurality of environment filters comprise one or more of a development environment filter, a testing environment filter, and a production environment filter that correspond to at least one of the plurality of release environments;
   responsive to receiving the selection of first and second environment filters, providing for display of a comparison between of a corresponding package from each of the release environments associated with the first and second environment filters; and
   responsive to detecting completion of a level in the releasing of the content data, causing packages to be promoted from one release environment corresponding to the first environment filter of the plurality of environment filters to another release environment corresponding to the second environment filter of the plurality of environment filters.

2. The method of claim 1, wherein promoting packages comprises modifying a version of the packages associated with the content data.

3. The method of claim 1, wherein promoting packages comprises removing a version of the packages associated with the content data.

4. The method of claim 1, wherein promoting packages comprises moving a version of the packages associated with the content data.

5. The method of claim 1, further comprising:
   receiving a selection of a keyword search term; and
   filtering the content data to identify the plurality of products in view of the keyword search term.

6. The method of claim 1, wherein promoting packages comprises adding one or more packages to the plurality of products associated with the content data.

7. The method of claim 1, further comprising responsive to receiving the selection of first and second environment filters:
   providing, in an interface of the release management system, entries corresponding to the first and second environment filters;
   receiving, by the interface, a label to associate with the entries; and
   responsive to receiving a selection of the label, populate contents of selected environment filters associated with the entries into a results area of the interface.

8. A non-transitory computer-readable medium having instructions that, when executed by a processing device, cause the processing device to:
- receive, using the processing device, a selection of content data identifying a plurality of products, each of the plurality of products comprising a plurality of packages, wherein the release management system comprises a plurality of release environments comprising a development environment, a testing environment, and a production environment with each release environment representing an installation area in which a portion of the packages associated with the content data is to be released;
- receive a selection of first and second environment filters from a plurality of environment filters, the plurality of environment filters comprise one or more of a development environment filter, a testing environment filter, and a production environment filter that correspond to at least one of the plurality of release environments;
- responsive to receiving the selection of first and second environment filters, provide, using the processing device, for display of a comparison between a corresponding package from each of the release environments associated with the first and second environment filters; and
- responsive to detecting completion of a level in the releasing of the content data, cause packages to be promoted from one release environment corresponding to the first environment filter of the plurality of environment filters to another release environment corresponding to the second environment filter of the plurality of environment filters.

9. The non-transitory computer-readable medium of claim 8, wherein to promote packages the instructions further cause the processing device to modify a version of the packages associated with the content data.

10. The non-transitory computer-readable medium of claim 8, to promote packages wherein the instructions further cause the processing device to remove a version of the packages associated with the content data.

11. The non-transitory computer-readable medium of claim 8, wherein to promote packages the instructions further cause the processing device to move a version of the packages associated with the content data.

12. The non-transitory computer-readable medium of claim 8, wherein the instructions further cause the processing device to:
- receive a selection of a keyword search term; and
- filter the content data to identify the plurality of products.

13. The non-transitory computer-readable medium of claim 8, wherein to promote packages the instructions further cause the processing device to:
- add one or more packages to the plurality of products associated with the content data.

14. A system comprising:
an interface of a release management system to:
- receive a selection of content data that identifies a plurality of products, each of the plurality of products comprising a plurality of packages, wherein the release management system comprises a plurality of release environments comprising a development environment, a testing environment, and a production environment with each release environment representing an installation area in which a portion of the packages associated with the content data is to be released;
- receive a selection of first and second environment filters from a plurality of environment filters, the plurality of environment filters comprise a development environment filter, a testing environment filter, and a production environment filter that correspond to at least one of the plurality of release environments; and a processing device operatively coupled to the interface to:
- responsive to receiving the selection of first and second environment filters, provide for display of a comparison between a corresponding package from each of the release environments associated with the first and second environment filters; and
- responsive to detecting completion of a level in the releasing of the content data, cause packages to be promoted from one release environment corresponding to the first environment filter of the plurality of environment filters to another release environment corresponding to the second environment filter of the plurality of environment filters.

15. The system of claim 14, wherein to promote the packages the processing device is further to modify a version of the packages associated with the content data.

16. The system of claim 14, wherein to promote the packages the processing device is further to remove a version of the packages associated with the content data.

17. The system of claim 14, wherein to promote the packages the processing device is further to move a version of the packages associated with the content data.

18. The system of claim 14, wherein the interface is further to receive a selection of a keyword search term, and wherein the processing device is to filter the content data to identify the plurality of products in view of the keyword search term.

19. The system of claim 14, wherein to promote the packages the processing device is further to add one or more packages to the plurality of products associated with the content data.

* * * * *

UNITED STATES PATENT AND TRADEMARK OFFICE
CERTIFICATE OF CORRECTION

PATENT NO. : 9,507,589 B2  
APPLICATION NO. : 14/074263  
DATED : November 29, 2016  
INVENTOR(S) : Malini A. Rao et al.

Page 1 of 1

It is certified that error appears in the above-identified patent and that said Letters Patent is hereby corrected as shown below:

On the Title Page

Item (72), Inventor 1 first name, delete "Milini" and insert --Malini--

Signed and Sealed this  
Twenty-fifth Day of April, 2017

Michelle K. Lee  
*Director of the United States Patent and Trademark Office*